United States Patent
Lanzon et al.

[11] Patent Number: 6,117,036
[45] Date of Patent: Sep. 12, 2000

[54] SPLIT HELICAL PLANETARY GEAR ASSEMBLY

[75] Inventors: James L. Lanzon, Fenton, Mich.; Richard Mizon, Fayetteville; Randolph C. Williams, Weedsport, both of N.Y.

[73] Assignee: New Venture Gear, Inc., Troy, Mich.

[21] Appl. No.: 09/363,561

[22] Filed: Jul. 29, 1999

[51] Int. Cl.[7] .................................................. F16H 37/08
[52] U.S. Cl. ........................ 475/204; 475/205; 475/341
[58] Field of Search ................................ 475/204, 198, 475/221, 205, 207; 74/665 GA

[56] References Cited

U.S. PATENT DOCUMENTS

| | | |
|---|---|---|
| 1,786,408 | 12/1930 | Peterson . |
| 2,905,007 | 9/1959 | Carlsen ................................. 74/409 |
| 3,359,819 | 12/1967 | Veillette et al. ..................... 74/409 |
| 3,881,444 | 5/1975 | Sigg ..................................... 115/37 |
| 4,036,074 | 7/1977 | Bodnar ................................ 74/409 |
| 4,612,816 | 9/1986 | Chalik ................................. 74/401 |
| 4,690,009 | 9/1987 | Rakhit ................................. 74/409 |
| 4,747,321 | 5/1988 | Hannel ................................ 74/440 |
| 4,805,475 | 2/1989 | Hannel ................................ 74/440 |
| 5,181,433 | 1/1993 | Ueno et al. .......................... 74/409 |
| 5,397,282 | 3/1995 | Weidman ........................... 475/205 |
| 5,400,672 | 3/1995 | Bunch, Jr. ............................ 74/409 |
| 5,427,580 | 6/1995 | Ledvina et al. ...................... 474/84 |
| 5,573,063 | 11/1996 | Morrow ............................ 166/68.5 |
| 5,728,022 | 3/1998 | Schultz ............................... 475/205 |
| 5,927,147 | 7/1999 | Morrow ............................... 74/410 |
| 5,957,804 | 9/1999 | Schulz et al. ...................... 475/331 |

FOREIGN PATENT DOCUMENTS

| | | | |
|---|---|---|---|
| 3801461 | 8/1989 | Germany ............................. 74/440 |
| 3803700 | 8/1989 | Germany ............................. 74/440 |
| 61-266870 | 11/1986 | Japan ................................. 74/440 |
| 62-113961 | 5/1987 | Japan ................................. 74/440 |
| 53-152769 | 6/1988 | Japan ................................. 74/440 |
| 337466 | 2/1991 | Japan ................................. 74/440 |
| 1546753 | 2/1990 | U.S.S.R. ............................. 74/440 |
| 334668 | 9/1930 | United Kingdom . |

Primary Examiner—Charles A Marmor
Assistant Examiner—Tisha D. Waddell
Attorney, Agent, or Firm—Harness, Dickey & Pierce, P.L.C.

[57] ABSTRACT

A split planetary gear assembly having a pair of helical gearsets. The first helical gearset includes a first sun gear, a first ring gear, and a set of first planet gears meshed with the first sun gear and the first ring gear. The second helical gearset includes a second sun gear, a second ring gear, and a set of second planet gears meshed with the second sun gear and the second ring gear. The components of the second helical gearset have the same number of teeth, helix angle, and tooth pitch as the components of the first helical gearset with the exceptions that their angular helix orientation (i.e., left-hand/right-hand) is reversed and they are circumferentially indexed by one-half tooth pitch. In addition, the first and second planet gears are arranged in paired sets and supported on a common pinion shaft which, in turn, is fixed to a planet carrier. The second sun gear is splined for rotation with and limited axial movement relative to the first sun gear.

20 Claims, 5 Drawing Sheets

SPLIT HELICAL PLANETARY GEAR ASSEMBLY

FIELD OF THE INVENTION

The present invention relates generally to planetary gear assemblies. More particularly, the present invention is directed to a split planetary gear assembly having a pair of phased helical gearsets and which may be used as a gear reduction unit in a two-speed transfer case.

DESCRIPTION OF THE BACKGROUND ART

Many light-duty trucks and sport-utility vehicles are equipped with a transfer case for providing a four-wheel drive mode of operation. To accommodate differing road surfaces and conditions, many transfer cases are equipped with a gear reduction unit that can be selectively shifted by the vehicle operator to establish high-range (i.e., direct drive) and low-range (i.e., reduced ratio drive) four-wheel drive modes. While layshaft-type gear reduction units are available, most transfer cases are now equipped with a planetary-type gear reduction unit due to improved efficiency and reduced size requirements. An example of such a planetary-type reduction unit installed in a four-wheel drive transfer case is shown in commonly-owned U.S. Pat. No. 4,770,280.

Due to inherent noise associated with spur gears, many planetary-type gear reduction units utilize helical gearing to provide quieter operation. However, a recognized design constraint associated with helical planetary gearsets is the opposing lateral thrust loads generated by the helix angle of the sun gear and ring gear must be contained. Moreover, it is desirable to allow the helical gearing to be self-centering for optimized sharing of the gear loads which may result in further improvements in durability and noise reduction. In the gear industry, it is known that herringbone gears can be used to address the thrust loading associated with conventional helical gearing. Herringbone gears, however, are difficult and costly to manufacture and, as such, have limited application to vehicular drivetrain products. As such, a need exists to develop planetary gear assemblies which advance the art and address the shortcomings of conventional planetary systems.

SUMMARY OF THE INVENTION

Accordingly, the present invention is directed to a split planetary gear assembly having a pair of helical gearsets. The first helical gearset includes a first sun gear, a first ring gear, and a set of first planet gears meshed with the first sun gear and the first ring gear. The second helical gearset includes a second sun gear, a second ring gear, and a set of second planet gears meshed with the second sun gear and the second ring gear. The components of the second helical gearset have the same number of teeth, helix angle, and tooth pitch as the components of the first helical gearset with the exceptions that their angular helix orientation is reversed and they are circumferentially indexed by one-half tooth pitch. In addition, the first and second planet gears are arranged in paired sets and supported on a common pinion shaft which, in turn, is fixed to a planet carrier. The second sun gear is splined for common rotation with and limited axial movement relative to the first sun gear.

In a preferred arrangement, the first and second helical gearsets are juxtapositioned with the first and second ring gears non-rotatably fixed to a stationary housing and rotary power being supplied from an input member to the first sun gear. A clutch sleeve is splined to an output member and is axially moveable thereon between a first position and a second position. With the clutch sleeve in its first position, it couples the output member to the second sun gear for establishing a first drive connection with the input member. With the clutch sleeve in its second position, it couples the output member to the planet carrier for establishing a second drive connection with the input member.

In accordance with the present invention, the split planetary gear assembly is installed in a four-wheel drive transfer case to provide high-range and low-range four-wheel drive modes.

BRIEF DESCRIPTION OF THE DRAWINGS

The present invention will become more fully understood from the detailed description given hereinbelow and the drawings which are given for purposes of illustration only and thus are not limitative of the present invention, and wherein.

DETAILED DESCRIPTION OF THE PREFERRED EMBODIMENT

In general, the present invention is directed to a two-speed planetary-type gear reduction unit operable for establishing two distinct speed ratio drive connections between an input member and an output member. More specifically, the gear reduction unit is a split planetary gear assembly including a first helical gearset having its gear components oppositely angled and circumferentially index or "phased" relative to the gear components of a second helical gearset. The planetary gear assembly of the present invention is particularly well-suited for use in a two-speed transfer case of the type used in four-wheel drive vehicles in conjunction with a range shift system to permit selective shifting between high-range and low-range drive modes.

Figure 1:
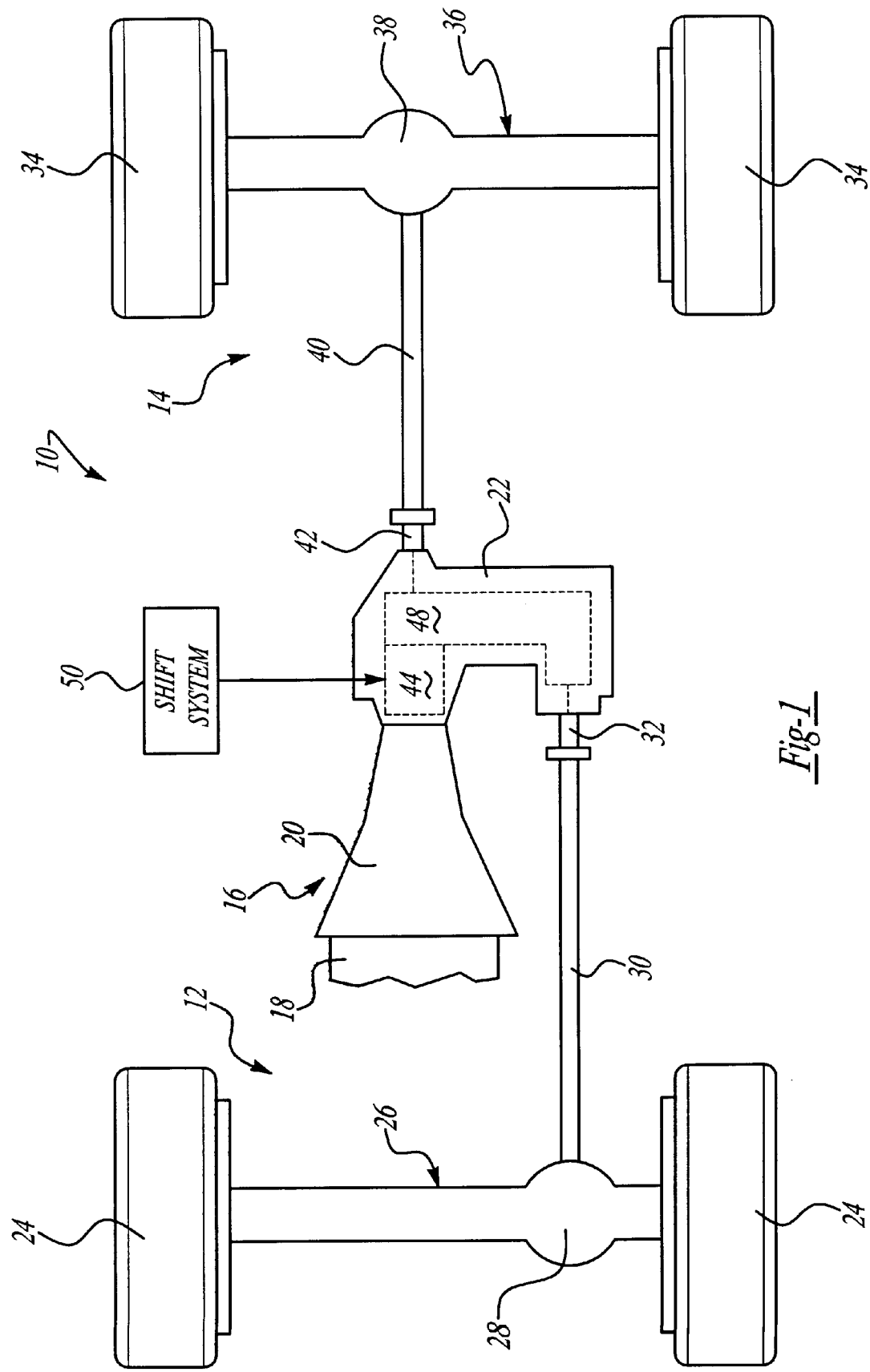
FIG. 1 is a schematic view of the drivetrain for a four-wheel drive vehicle having a transfer case equipped with a gear reduction unit embodying a split planetary gear assembly according to the present invention.

Referring to FIG. 1, a drivetrain 10 for use in a four-wheel drive motor vehicle is shown to include a front driveline 12, a rear driveline 14, and a powertrain 16 for supplying rotary power to the drivelines. Powertrain 16 includes an engine 18, a multi-speed transmission 20, and a transfer case 22. Front driveline 12 includes front wheels 24 connected to axleshafts of a front axle assembly 26 having a front differential 28 that is coupled to one end of a front propshaft 30, the opposite end of which is coupled to a front output shaft 32 of transfer case 22. Similarly, rear driveline 14 includes rear wheels 34 connected to axleshafts of a rear axle assembly 36 having a rear differential 38 coupled to one end of a rear propshaft 40, the opposite end of which is interconnected to a rear output shaft 42 of transfer case 22.

In operation, transfer case 22 functions to transfer drive torque from transmission 20 to one or both of the drivelines. In this regard, transfer case 22 includes a gear reduction unit 44 for permitting selective establishment of two distinct speed ratio drive connections between the output of transmission 20 and rear output shaft 42. In addition, transfer case 22 is equipped with a torque transfer mechanism 48 for permitting drive torque to be transferred from rear output shaft 42 to front output shaft 32 to establish a four-wheel drive mode of operation. Typically, torque transfer mechanism 48 includes a drive sprocket supported on rear output shaft 42, a driven sprocket fixed to front output shaft 32, and a power chain interconnecting the drive and driven sprockets. In addition, torque transfer mechanism 48 includes a coupling unit for selectively (part-time 4WD systems), automatically (on-demand 4WD systems), and/or continuously (full-time AWD systems) transferring power to the drive sprocket for supplying drive torque to front driveline 12. For example, commonly-owned U.S. Pat. No. 4,770,280 shows the coupling unit as a synchronized mode shift system in a part-time 4WD transfer case, commonly owned U.S. Pat. No. 5,704,863 shows the coupling unit as a hydromechanical coupling in an on-demand 4WD transfer case, commonly-owned U.S. Pat. No. 5,363,938 shows the coupling unit as a mechanically-actuated clutch pack in another on-demand 4WD transfer case, and commonly-owned U.S. Pat. No. 4,677,873 shows the coupling unit as an interaxle differential in a full-time 4WD transfer case. These exemplary coupling units are illustrative of the numerous arrangements known in the four-wheel drive art and in no way are they intended to limit the present invention. Finally, drivetrain 10 is shown to further include a shift system 50 for permitting selective control over operation of gear reduction unit 44 and possibly actuation of the coupling unit.

Figure 2:
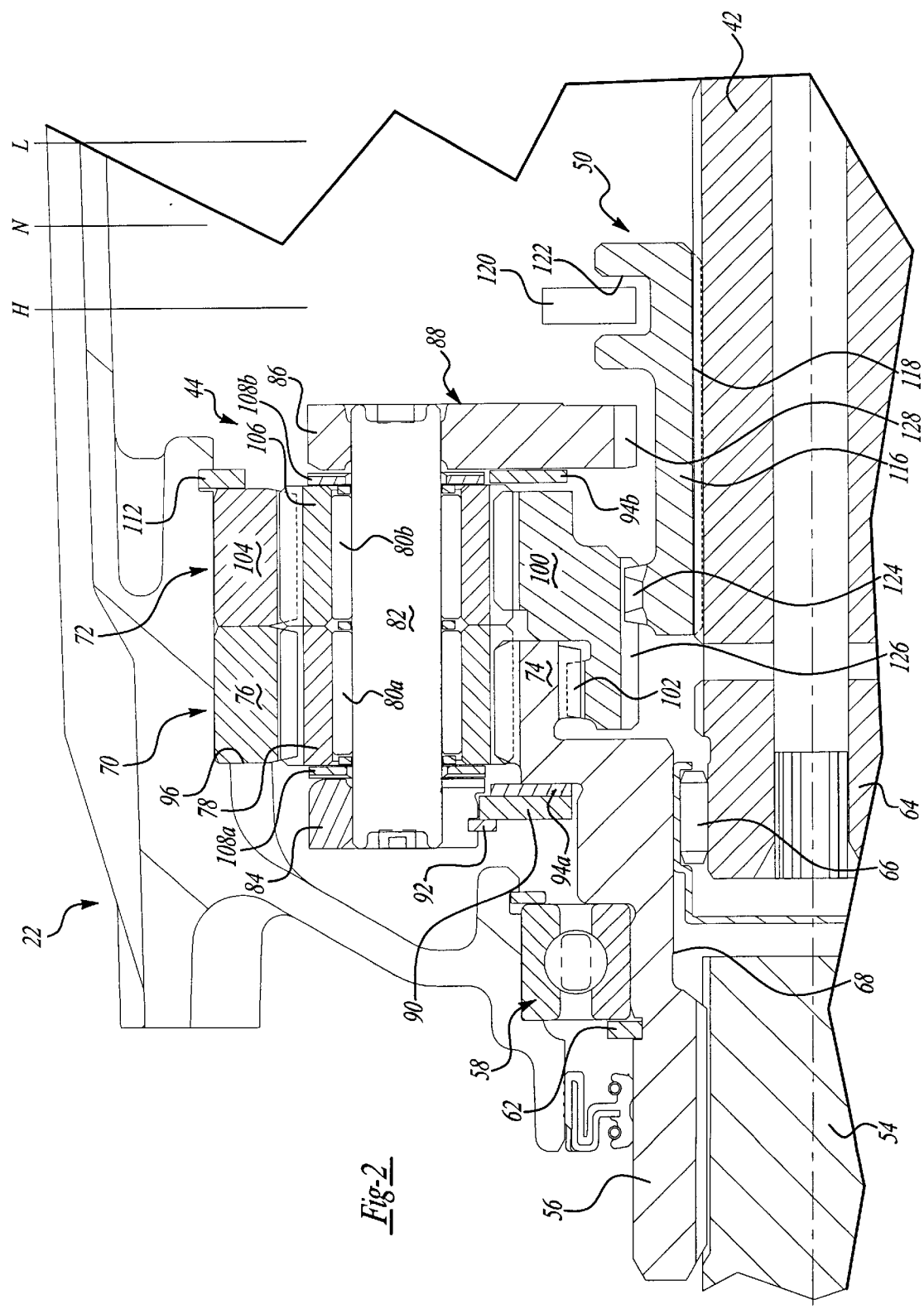
FIG. 2 is a partial sectional view of the transfer case showing details of the split planetary gear assembly.

Referring now to FIG. 2, a portion of transfer case 22 is shown to illustrate the components associated with gear reduction unit 44. A housing 52 of transfer case 22 receives a transmission output shaft 54 that is coupled (i.e., splined) to a transfer case input shaft 56. A bearing assembly 58 axially locates and supports input shaft 56 for rotation in housing 52. As seen, an outer race of bearing assembly 58 bears against a radial shoulder surface of housing 52 and is axially restrained by a snap ring 60. Likewise, an inner race of bearing assembly 58 abuts against a radial shoulder surface of input shaft 56 and is axially restrained by a snap ring 62. A pilot end 64 of rear output shaft 42 is shown rotatably supported by a bearing assembly 66 in a pilot bore 68 formed in input shaft 56. Gear reduction unit 44 is operably installed between input shaft 56 and rear output shaft 42. Thus, input shaft 56 acts as an input member for driving gear reduction unit 44 while rear output shaft 42 acts as an output member which can be selectively coupled to either of two different rotary components of gear reduction unit 44.

According to the present invention, gear reduction unit 44 is a split planetary gear assembly comprised of a first helical planetary gearset 70 and a second helical planetary gearset 72 arranged in a side-by-side orientation. First gearset 70 includes a first sun gear 74 fixed for rotation with input shaft 56, a first ring gear 76 non-rotatably fixed to housing 52, and a set of first planet gears 78 that are meshed with first sun gear 74 and first ring gear 76. Each first planet gear 78 is rotatably supported by a bearing assembly 80a on a pinion shaft 82 having its opposite ends retained in front and rear carrier plates 84 and 86, respectively, which are interconnected to define a planet carrier 88. Pinion shafts 82 are equally-spaced and circumferentially arranged with respect to planet carrier 88. A retainer plate 90 is secured via a snap ring 92 to front carrier plate 84 and a first bearing plate 94a is disposed between retainer plate 90 and first sun gear 74 to accommodate relative rotation therebetween. First ring gear 76 is splined or keyed to housing 52 for non-rotatably securing first ring gear 76 thereto. In addition, a face surface of first ring gear 76 is retained against a radial stop shoulder 96 formed in housing 52.

Second helical planetary gearset 72 includes a second sun gear 100 fixed via a splined connection 102 for rotation with first sun gear 74, a second ring gear 104 non-rotatably fixed to housing 52, and a set of second planet gears 106 that are each meshed with second sun gear 100 and second ring gear 104. Each second planet gear 106 is rotatably supported by a bearing assembly 80b on pinion shaft 82 directly adjacent to a corresponding first planet gear 78. Suitable thrust washers 108a and 108b are disposed between planet gears 78 and 106 and the corresponding carrier plates 84 and 86. A second bearing plate 94b is disposed between second sun gear 100 and rear carrier plate 86 to accommodate relative rotation therebetween. In a manner similar to first ring gear 76, second ring gear 104 is splined or keyed to housing 52 for non-rotatably securing second ring gear 104 thereto. A snap ring 112 restrains ring gears 76 and 104 against axial movement.

Figure 3:
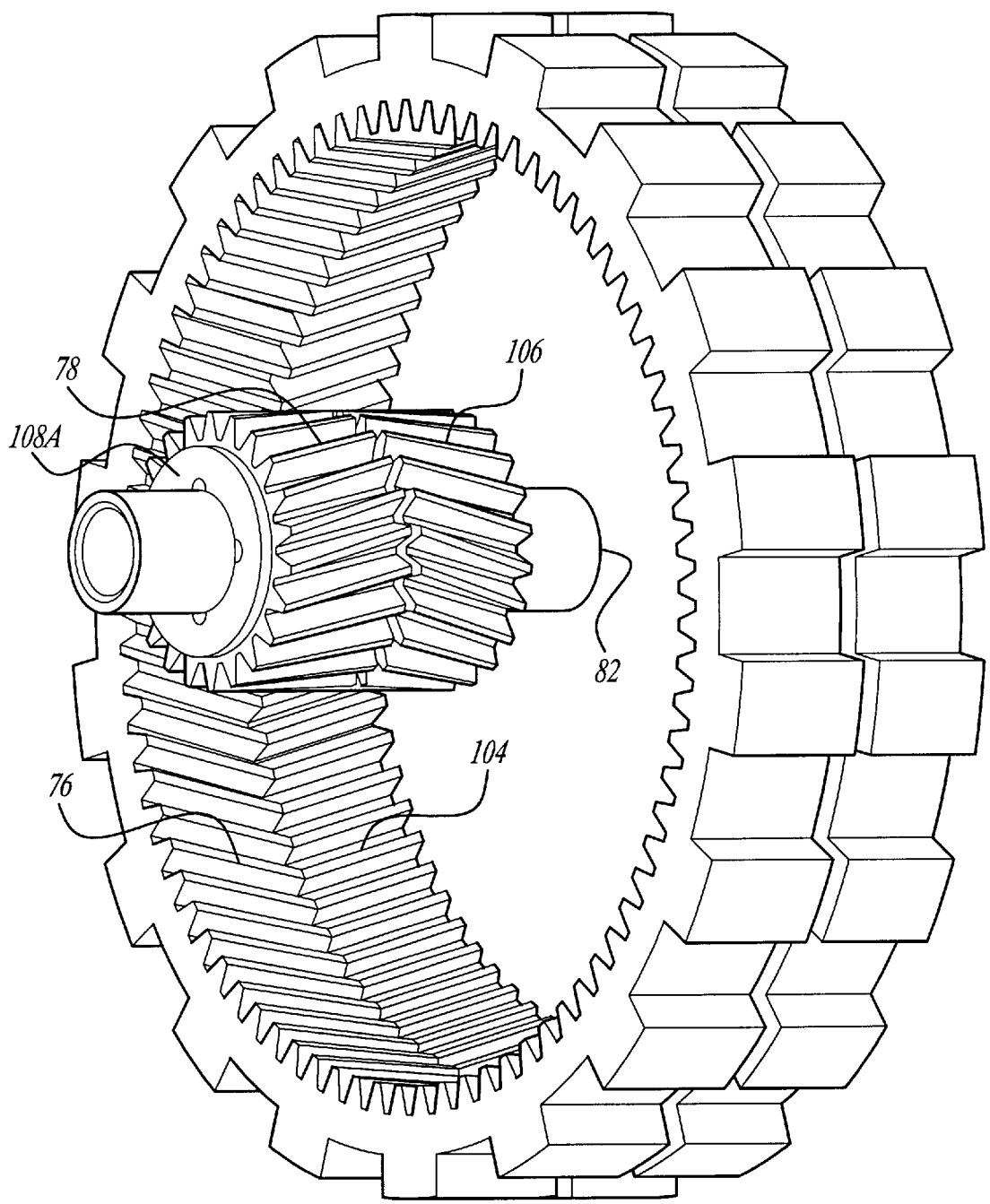
FIG. 3 is a pictorial view showing components of the split planetary gear assembly.

In accordance with the present invention, the helical gear components of second planetary gearset 72 have the same number of teeth, helix angle and tooth pitch as the corresponding helical gear components of first planetary gearset 70. However, the angular helix orientation (i.e., left-hand or right-hand) of the helical gear components of secondary planetary gearset 72 are reversed with respect to the corresponding helical gear components of first planetary gearset 70 and they are circumferentially phased or "indexed" by one-half tooth pitch. For example, if the helix orientation is right-handed for first sun gear 74, then the helix orientation is left-handed for second sun gear 100. Plus, the helical gear teeth of second sun gear 100 are circumferentially indexed by one-half tooth pitch relative to the helical gear teeth of first sun gear 74. A similar one-half tooth pitch indexing is provided between first ring gear 76 and second ring gear 104 as well as between each pair of commonly-aligned first and second planet gears 78 and 106. As such, equal and opposite axial thrust forces will be generated for substantially minimizing or eliminating the "net" thrust forces ultimately transferred to housing 52. These reverse angular inclination and circumferential indexing features are clearly shown in FIG. 3. Moreover, the splined connection 102 between sun gears 74 and 100 functions to permit limited axial translation of second sun gear 100 relative to first sun gear 74 so as to promote improved balancing of the gear loads. Furthermore, planet carrier 88 is free to float radially for negating unbalanced torque loads.

With continued reference to FIG. 2, shift system 50 is shown to include a range sleeve 116 which is fixed via a splined connection 118 to rear output shaft 42 for rotation therewith. Range sleeve 116 is axially movable relative to rear output shaft 42 between a high-range position (position line "H"), a neutral position (position line "N"), and a low-range position (position line "L") for establishing corresponding drive connections between input shaft 56 and rear output shaft 42. As seen, a portion of a range fork 120 is nested in an annular groove 122 formed in range sleeve 116. As is conventional, range fork 120 is operably connected to a shift actuator associated with shift system 50 for causing manually-actuated or power-operated movement of range sleeve 116 to one of the three distinct range positions. Range sleeve 116 includes external clutch teeth 124 that are selectively engageable with internal clutch teeth 126 formed on second sun gear 100 when range sleeve 116 is in its high-range position (as shown). With range sleeve 116 in its high-range position, a direct drive connection is established between input shaft 56 and rear output shaft 42 to define a high-range drive mode for transfer case 22. Likewise, clutch teeth 124 are selectively engageable with internal clutch teeth 128 formed on rear carrier plate 86 when range sleeve 116 is in its low-range position, whereby a reduced ratio drive connection is established between input shaft 56 and rear output shaft 42 for defining a low-range drive mode. Finally, a neutral mode is established when range sleeve 116 is located in the neutral position whereat its clutch teeth 124 are disengaged from clutch teeth 126 on second sun gear 100 and clutch teeth 128 on rear carrier plate 86.

Figure 4:
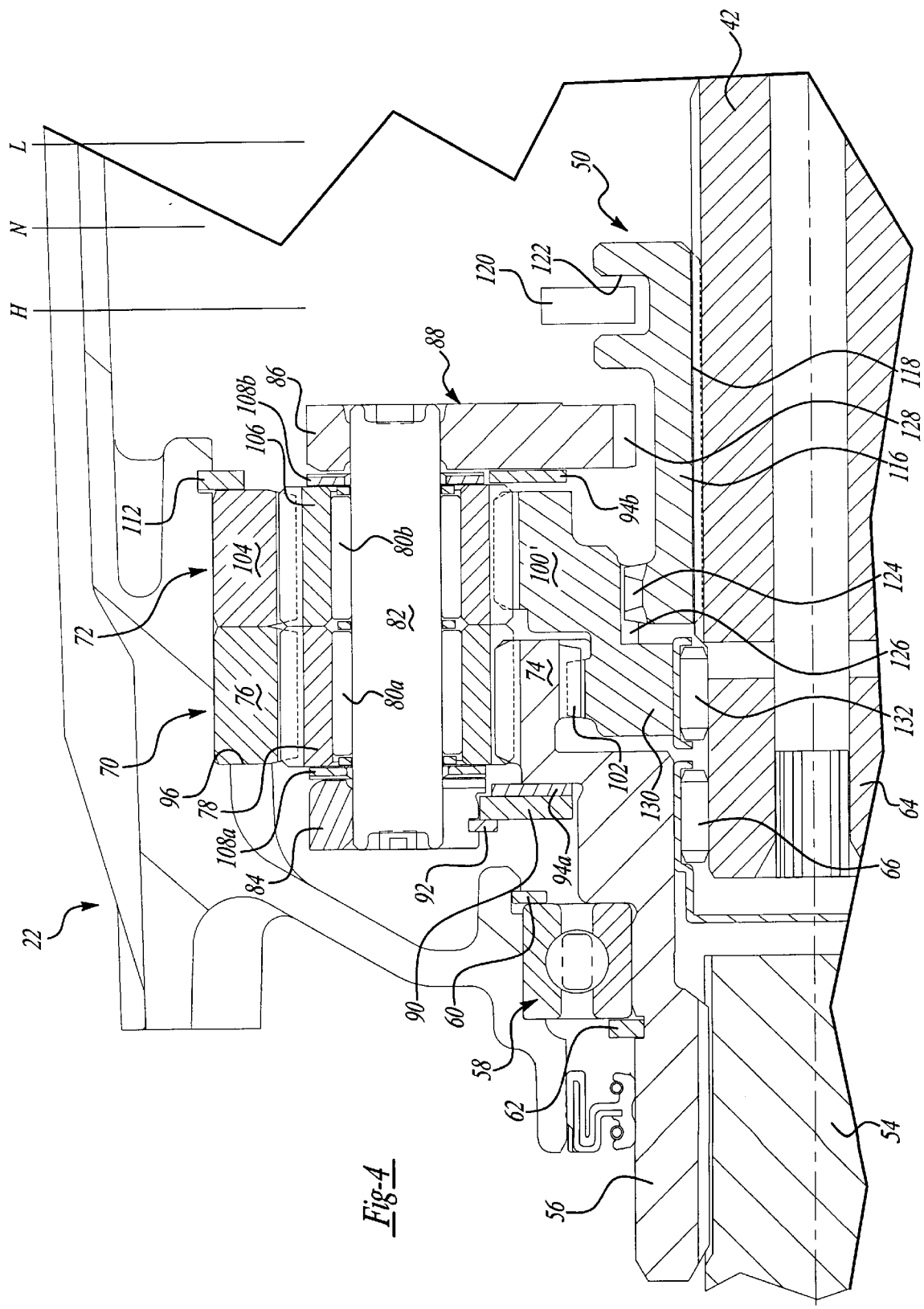
FIGS. 4 and 5 are sectional views, similar to FIG. 2, showing modified constructions for the split planetary gear assembly of the present invention.
Figure 5:
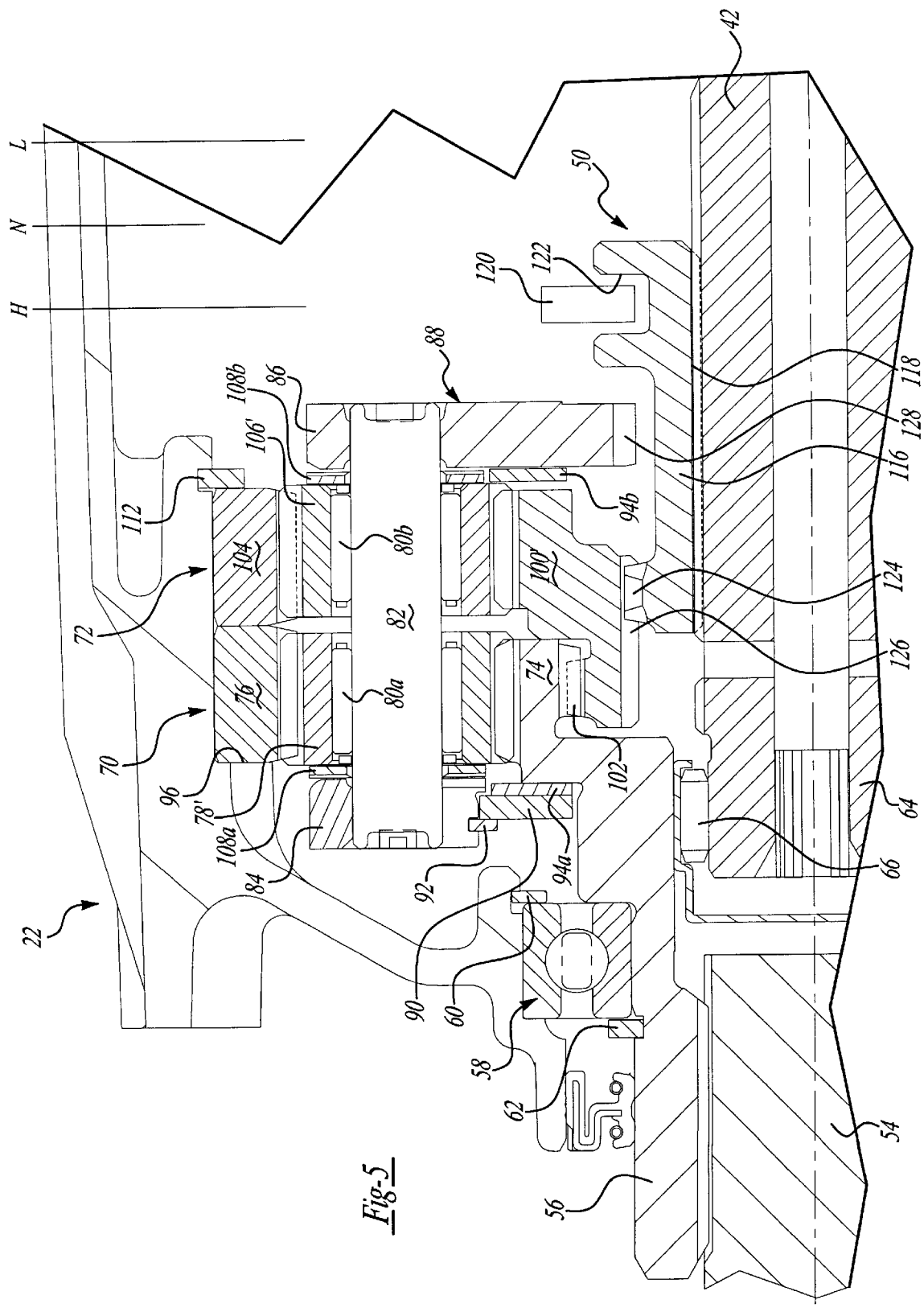

Referring now to FIG. 4, a modified version of gear reduction unit 44 is shown. This construction is generally identical to that shown in FIG. 2 with the exception that second sun gear 100' now includes a radial hub segment 130 that is journalled by a suitable bushing or bearing assembly 132 on pilot segment 64 of rear output shaft 42 for axial sliding movement relative thereto. This hub feature is provided to reduce the radial play of second sun gear 100'. In a similar manner, FIG. 5 illustrates a modified version of the construction shown in FIG. 2 wherein planet gears 78' and 106' have a reduced thickness so as to define an axial gap therebetween. Thus, the matched pairs of planet gears 78' and 106' are free to move axially through a limit range of travel on pinion shafts 82 to provide a self-centering feature for balancing the gear loads.

Various advantages are provided in conjunction with the dual or split planetary gear assembly of the present invention when compared to traditional single helical gearsets. For example, the self-cancelling of the thrust loads eliminates many of the design constraints associated with transferring and absorbing such thrust loads. In addition, the circumferential indexing acts to phase the excitation (i.e., noise) curves by cancelling their frequencies, thereby resulting in reduced noise and vibration. Furthermore, the arrangement provides for improved balance of the meshed gear loads to permit a reduction in the overall gear precision required for comparable applications.

Although the present invention has been described in association with a gear reduction unit for a transfer case, this is to be considered as merely exemplary. As such, the split helical planetary gear assembly of the present invention is readily adaptable for use in other vehicular and non-vehicular applications where similar operating characteristics are desired. Accordingly, the foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A gear reduction unit comprising:
   an input member;
   an output member;
   a planet carrier having a pinion shaft;
   a first gearset having gear components with helical gear teeth comprising a first sun gear fixed for rotation with said input member, a first ring gear, and a first planet gear rotatably supported on said pinion shaft and meshed with said first sun gear and said first ring gear;
   a second gearset having gear components with helical gear teeth comprising a second sun gear fixed for rotation with said first sun gear, a second ring gear, and a second planet gear rotatably supported on said pinion shaft and meshed with said second sun gear and said second ring gear, said gear components of said second gearset having the same number of helical teeth with the same helix angle and tooth pitch as said gear components of said first gearset, and wherein said gear components of said second gearset are arranged to have the opposite helix inclination and are circumferentially indexed by one-half tooth pitch relative to corresponding gear components of said first gearset; and
   a clutch operable for selectively coupling said output member for rotation with one of said second sun gear and said planet carrier.

2. The gear reduction unit of claim 1 wherein said input member is rotatably supported from a housing, and wherein said first and second ring gears are non-rotatably secured to said housing.

3. The gear reduction unit of claim 1 wherein said planet carrier includes first and second carrier rings, and wherein said first and second sun gears and said first and second planet gears are disposed between said first and second carrier rings.

4. The gear reduction unit of claim 1 wherein said second sun gear is splined to said first sun gear to permit axial movement of said second sun gear relative to said first sun gear.

5. The gear reduction unit of claim 1 wherein said input member is an input shaft, said output member is an output shaft, and said clutch includes a clutch sleeve splined for rotation with said output shaft and sliding movement thereon between first and second positions, said clutch sleeve is operable in its first position to couple said second sun gear to said output shaft such that said output shaft is driven at a first speed ratio relative to said input shaft, and said clutch sleeve is operable in its second position to couple said planet carrier to said output shaft such that said output shaft is driven at a second speed ratio relative to said input shaft.

6. The gear reduction unit of claim 5 wherein said clutch sleeve is further movable to a third position for uncoupling said output shaft from said second sun gear and said planet carrier.

7. A transfer case for delivering drive torque from a powertrain to front and rear drivelines of a four-wheel drive motor vehicle, comprising:
   a housing;
   an input shaft rotatably supported from said housing and driven by the powertrain;
   an output shaft rotatably supported between said input shaft and said housing and operably coupled to one of the front and rear drivelines;
   a planetary gear assembly including a planet carrier and first and second gearsets, said first gearset having gear components with helical gear teeth comprising a first sun gear fixed for rotation with said input shaft, a first ring gear, and a first planet gear rotatably supported on a pinion shaft of said planet carrier and which is meshed with said first sun gear and said first ring gear, said second gearset having gear components with helical gear teeth comprising a second sun gear fixed for rotation with said first sun gear, a second ring gear, and a second planet gear rotatably supported on said pinion shaft and meshed with said second sun gear and said second ring gear, said gear components of said second gearset having the same number of helical teeth with the same helix angle and tooth pitch as said gear components of said first gearset, and wherein said gear components of said second gearset are arranged to have the opposite helix inclination and are circumferentially indexed by one-half tooth pitch relative to corresponding gear components of said first gearset; and a clutch operable for selectively coupling said output shaft for rotation with one of said second sun gear and said planet carrier.

8. The transfer case of claim 7 wherein said first and second ring gears are non-rotatably secured to said housing.

9. The transfer case of claim 7 wherein said planet carrier includes first and second carrier rings, and wherein said first and second sun gears and said first and second planet gears are disposed between said first and second carrier rings.

10. The transfer case of claim 7 wherein said second sun gear is splined to said first sun gear to permit axial travel of said second sun gear relative to said first sun gear.

11. The transfer case of claim 7 wherein said clutch includes a clutch sleeve splined for rotation with said output shaft and sliding movement thereon between first and second positions, said clutch sleeve is operable in its first position to couple said second sun gear to said output shaft such that said output shaft is driven at a first speed ratio relative to said input shaft, and said clutch sleeve is operable in its second position to couple said planet carrier to said output shaft such that said output shaft is driven at a second speed ratio relative to said input shaft.

12. The transfer case of claim 11 wherein said clutch sleeve is further movable to a third position for uncoupling said output shaft from said second sun gear and said planet carrier.

13. A gear reduction unit comprising:

an input shaft;

an output shaft;

a planet carrier having a pinion shaft;

a first gearset having gear components with helical gear teeth comprising a first sun gear fixed for rotation with said input shaft, a first ring gear, and a first planet gear rotatably supported on said pinion shaft and meshed with said first sun gear and said first ring gear;

a second gearset having gear components with helical gear teeth comprising a second sun gear fixed for rotation with said first sun gear, a second ring gear, and a second planet gear rotatably supported on said pinion shaft and meshed with said second sun gear and said second ring gear, said gear components of said second gearset having the same number of helical teeth with the same helix angle and tooth pitch as said gear components of said first gearset, and wherein said gear components of said second gearset are arranged to have the opposite helix inclination and are circumferentially indexed by one-half tooth pitch relative to corresponding gear components of said first gearset; and a clutch operable for selectively coupling said output shaft for rotation with one of said second sun gear and said planet carrier, said clutch including a clutch sleeve splined for rotation with said output shaft and sliding movement thereon between first and second positions, said clutch sleeve is operable in its first position to couple said second sun gear to said output shaft such that said output shaft is driven at a first speed ratio relative to said input shaft, and said clutch sleeve is operable in its second position to couple said planet carrier to said output shaft such that said output shaft is driven at a second speed ratio relative to said input shaft.

14. The gear reduction unit of claim 13 wherein said clutch sleeve is further movable to a third position for uncoupling said output shaft from said second sun gear and said planet carrier.

15. The gear reduction unit of claim 13 wherein said planet carrier includes first and second carrier rings, and wherein said first and second sun gears and said first and second planet gears are disposed between said first and second carrier rings.

16. The gear reduction unit of claim 13 wherein said second sun gear is splined to said first sun gear to permit axial movement of said second sun gear relative to said first sun gear.

17. A transfer case for delivering drive torque from a powertrain to front and rear drivelines of a four-wheel drive motor vehicle, comprising:

a housing;

an input shaft rotatably supported from said housing and driven by the powertrain;

an output shaft rotatably supported between said input shaft and said housing and operably coupled to one of the front and rear drivelines;

a planetary gear assembly including a planet carrier and first and second gearsets, said first gearset having gear components with helical gear teeth comprising a first sun gear fixed for rotation with said input shaft, a first ring gear, and a first planet gear rotatably supported on a pinion shaft of said planet carrier and which is meshed with said first sun gear and said first ring gear, said second gearset having gear components with helical gear teeth comprising a second sun gear fixed for rotation with said first sun gear, a second ring gear, and a second planet gear rotatably supported on said pinion shaft and meshed with said second sun gear and said second ring gear, said gear components of said second gearset having the same number of helical teeth with the same helix angle and tooth pitch as said gear components of said first gearset, and wherein said gear components of said second gearset are arranged to have the opposite helix inclination and are circumferentially indexed by one-half tooth pitch relative to corresponding gear components of said first gearset; and a clutch operable for selectively coupling said output shaft for rotation with one of said second sun gear and said planet carrier, said clutch including a clutch sleeve splined for rotation with said output shaft and sliding movement thereon between first and second positions, said clutch sleeve is operable in its first position to couple said second sun gear to said output shaft such that said output shaft is driven at a first speed ratio relative to said input shaft, and said clutch sleeve is operable in its second position to couple said planet carrier to said output shaft such that said output shaft is driven at a second speed ratio relative to said input shaft.

18. The transfer case of claim 17 wherein said clutch sleeve is further movable to a third position for uncoupling said output shaft from said second sun gear and said planet carrier.

19. The transfer case of claim 17 wherein said planet carrier includes first and second carrier rings, and wherein said first and second sun gears and said first and second planet gears are disposed between said first and second carrier rings.

20. The transfer case of claim 17 wherein said second sun gear is splined to said first sun gear to permit axial travel of said second sun gear relative to said first sun gear.

* * * * *